UNITED STATES PATENT OFFICE.

WILLIAM H. DIBBLE, OF ELIZABETH, NEW JERSEY.

IMPROVEMENT IN PROCESSES OF MAKING COMPOSITION ARTICLES.

Specification forming part of Letters Patent No. 192,863, dated July 10, 1877; application filed November 18, 1875.

*To all whom it may concern:*

Be it known that I, WILLIAM H. DIBBLE, of Elizabeth, in the county of Union and State of New Jersey, have invented a new and useful Process for Making Solid or Composite Articles to be used for various purposes, which process is fully set forth in the following specification:

This invention relates to that class of processes employed for fabricating solid or composite articles for ornamental or other use from the pulverized or granulated constituents of the same; and it consists in mixing with the blood of animals, as obtained from the abattoir, certain pulverized or granulated materials, in quantities about equal, by weight, to the blood used—though the exact quantity of blood used may be varied considerably, if desired—then drying the mass by either natural or artificial heat, and finally subjecting the dried or partially-dried mass to heavy pressure in molds of any desired shape, heated to a temperature of from 200° to 500° Fahrenheit.

In carrying out this invention, the powdered or granulated material used may be either organic or inorganic, such as animal or vegetable substances, or mineral or earthy matter, any suitable substance or substances of either of which classes may be used, either alone with the blood or jointly with the blood. The substances chiefly employed in this process are sawdust or other woody fiber, powdered clay, powdered slate, or other powdered minerals and metallic powders.

The articles made by this process possess great hardness and durability, and are possessed of a fine polish, and are of value for many useful as well as decorative or ornamental purposes. They can be used for table-surfaces, chair-seat frames, mantles, moldings of various patterns, wainscotings, and for a great variety of other purposes.

I am aware that pulverized mineral substances have heretofore been mixed with blood for making varnishes and veneers, and other stock from which to cold-punch or cut various articles, said articles to be afterward baked; but such process is not similar to mine, and such I do not claim. I am also aware that both organic and inorganic substances have been pulverized and mixed and molded with albumen, size, glue, and gelatinous substances into articles of various forms; but I wish it to be understood that I disclaim the use of albumen in my process, although it may be present in the blood when used, yet it is not necessary to my process, and I can use the blood as well after it has been deprived of its albumen as if the albumen were present. In no process heretofore used, known to me, has the mass of pulverized or granulated material, when mixed with blood, been first subjected to heat, and then subjected to pressure in heated molds for the final and complete operation.

I therefore claim as my invention—

The process of making composite articles, hereinbefore described, consisting of first mixing either organic or inorganic pulverized or granulated substances with blood, then subjecting the mass so formed to heat, and finally compressing said mass under great pressure in heated molds of any desired form, all substantially in manner and proportion as described.

In testimony that I claim the foregoing I have hereunto set my hand and seal this 11th day of November, 1875.

WILLIAM H. DIBBLE. [L. S.]

Witnesses:
W. HAUFF,
E. F. KASTENHUBER.